US005410879A

United States Patent [19]

Houze

[11] Patent Number: 5,410,879

[45] Date of Patent: May 2, 1995

[54] DEVICE FOR THE CONTROLLING OF A VARIABLE-MOMENT VIBRATOR

[75] Inventor: Christian Houze, Paris, France

[73] Assignee: Procedes Techniques de Construction, France

[21] Appl. No.: 71,635

[22] Filed: Jun. 4, 1993

[30] Foreign Application Priority Data

Jun. 19, 1992 [FR] France ............................ 92 07555

[51] Int. Cl.[6] .................... F16D 31/02; F16H 61/00

[52] U.S. Cl. .................................... 60/469; 60/484; 74/61

[58] Field of Search .................... 60/469, 484; 74/61, 74/87; 91/51

[56] References Cited

U.S. PATENT DOCUMENTS

| | | | |
|---|---|---|---|
| 3,004,389 | 10/1961 | Muller | 74/61 X |
| 4,771,645 | 9/1988 | Persson | 74/61 |
| 5,010,778 | 4/1991 | Riedl | 74/61 |
| 5,177,386 | 1/1993 | Shimada | 74/61 X |

FOREIGN PATENT DOCUMENTS

| | | | |
|---|---|---|---|
| 467758 | 1/1992 | European Pat. Off. | 74/61 |
| 0524056 | 1/1993 | European Pat. Off. | |
| 1566358 | 3/1969 | France . | |
| 0897988 | 9/1989 | WIPO . | |

*Primary Examiner*—Edward K. Look
*Assistant Examiner*—John Ryznic
*Attorney, Agent, or Firm*—William A. Drucker

[57] ABSTRACT

The device embodying the invention uses a phase shifter controlled by a dual-effect hydraulic acting element comprising a phase shifting chamber connected to the distributor output via a circuit comprising a nonreturn valve and a hydraulic accumulator whose load pressure can be limited by means of a limiter and a rephasing chamber whose pressure is controlled by a pressure regulator so that a predetermined phase shift corresponds with each regulator control value. The invention applies notably to the driving into the ground of objects such as stakes or sheet piles.

27 Claims, 5 Drawing Sheets

DEVICE FOR THE CONTROLLING OF A VARIABLE-MOMENT VIBRATOR

BACKGROUND OF THE INVENTION

1. Field of the Invention

This invention relates to a device for the controlling of a variable-moment vibrator such as e.g. the one described in U.S. Pat. No. 5,253,542, filed on Jul. 14, 1992 in the name of the filing party hereof and patented on Oct. 19, 1993.

2. Description of the Prior Art

It is a known fact that vibrators of this type serving e.g. to drive objects such as stakes or sheet piles into the ground, use at least one pair of off-center rotating feeders, or even two trains of feeders driven in opposite direction to one another, at a same rotational speed.

With a view to regulating the amplitude of the vibrations generated by the vibrator, especially to avoid harmful transitional phenomena during the start-up and shutdown phases, and to take the mechanical characteristics of the ground into account, devices have been proposed enabling an angular displacement to be generated between the two feeders of the pair or between the two trains of feeders.

Such devices can use a Pecqueur-type planetary gear train, as described in French patent No. 1,566,358 in the name of the filing party hereof, or even a rotating link using a hydraulically controlled phase shifter, e.g. of the type comprising two rotating elements axially mobile in relation to one another and against the action of a spring, under the effect of a pressurized fluid.

OBJECT OF THE INVENTION

The main object of this invention is more particularly to provide a control device enabling full advantage to be gained from the principle of variation of the moment by a phase shifting of the feeder train. More particularly, it provides a device for the controlling of a variable-moment vibrator of the type comprising at least two off-center rotating feeders rotatably driven at a same speed and a phase shifter capable of generating an angular displacement between these feeders while they are rotating, the phase shifter being controlled by means of a dual-effect hydraulic acting element comprising a rephasing chamber and a phase shifting chamber separated by a piston, this acting element being supplied with pressurized fluid discharged by a pump via a hydraulic circuit comprising a distributor having at least:

an idle position in which it interrupts the supply of pressurized fluid to one or other or to both the chambers of the acting element, and a working position in which the distributor orientates the pressurized fluid to one of the above-mentioned chambers, via a first distributing circuit.

SUMMARY OF THE INVENTION

Accordingly, there is provided a device wherein said first distributing circuit comprises a first limiting means enabling, by way of a control mechanism, the pressure it applies to said chamber to be varied within a predetermined range, and wherein the other chamber is connected to a second distributing circuit comprising a means enabling the pressure it applies to this second chamber to be modulated, according to an appropriate counterprofile, so that the acting element applies a motive force to the phase shifter in keeping with the tractive resistance resulting from the amplitude of the vibrator movement and that a predetermined amplitude of the vibrations thus corresponds to each value displayed on the control mechanism.

According to another feature of the invention, the distributor is put into the idle position upon starting up the motor associated with the auxiliary hydraulic pump supplying the phase shifter, and then into the rephasing position when certain conditions are fulfilled, e.g. when the discharge rate of the main hydraulic pump supplying the vibrator reaches a predetermined minimum value (e.g. a discharge rate corresponding to a minimum frequency of the vibrator). Start-up of the vibrations is thus obtained at a given frequency without generating undesirable low-frequency vibrations beforehand.

Of course, before shutting down the vibrator and, more generally, before reducing the speed of the feeders below a threshold value, the distributor must be brought back to the phase shifting position. This process can be performed automatically once the pump discharge rate conditions and therefore the frequency conditions are no longer fulfilled, but so as to be completed before undesirable low-frequency vibrations can reoccur.

A further advantage of the device previously described consists in that it enables the ridding of nuisances caused by decreases of the frequency of the vibrator due to e.g. the evacuating of part of the discharge rate by the triggering of a high-pressure safety valve provided in the hydraulic circuit and/or a decreasing of the discharge rate of the hydraulic pump subsequent to an excessive pressure rise by comparison with the safety pressure of the circuit or in relation to the output that can be supplied by the thermal engine driving the hydraulic transmission.

In fact, this result is achieved by one of the two following methods in both of which the triggering is automatically controlled by the measurement of a hydraulic fluid pressure just below the pressure triggering the decrease of the discharge rate or by the detection of conditions requiring that the amplitude of the vibrations be decreased in order to correct them.

These two methods consist in:

i) acting directly on the supply to the rephasing circuit by tripping the distributor to the idle position;

ii) providing, in parallel to the rephasing output, a second distributor which, when triggered, makes the rephasing chamber communicate with a pressure limiter preset to the pressure corresponding to the required amplitude decrease.

These actions enable the generation of both a fall-off of the pressure of the hydraulic fluid and, as a result of the enhanced output of the hydraulic transmission and a lesser load of the main thermal engine, an accumulation of the rotational speed of the feeder trains, with an increase in the momentum of the latter.

When the pressure is seen to fall below the critical pressure, this entails a reverse tripping of the main distributor (method i)), of the second distributor (method ii)), and therefore a rephasing of the phase shifter and a redeploying of the moment. For an instant, the vibrator disposes of the both the energy supplied by the hydraulic engines and the momentum accumulated in the feeders.

This transitional phase is continued until the pressure of the hydraulic fluid again reaches its critical value or until the reappearance of the conditions requiring the amplitude of the vibrations to be reduced.

Particularly efficient pulsatory (pumping) operating conditions are thus established for difficult ground, while avoiding falling below the frequencies that generate undesirable shocks.

Adjustment of the pumping period can be achieved by adjusting the high pressure tripping thresholds, and/or the outlet pressure (method ii)).

A further advantage of the method previously described consists in that it enables the amplitude command to be automatically controlled either for a noise level measured at the site, or for a vibratory amplitude level measured in the ground or on a structure.

BRIEF DESCRIPTION OF THE DRAWINGS

Further features and advantages of the invention will be clear from the embodiments described hereafter, by way of non limiting examples, with reference to the accompanying drawings in which.

DESCRIPTION OF THE PREFERRED EMBODIMENTS

Figures 1, 2:
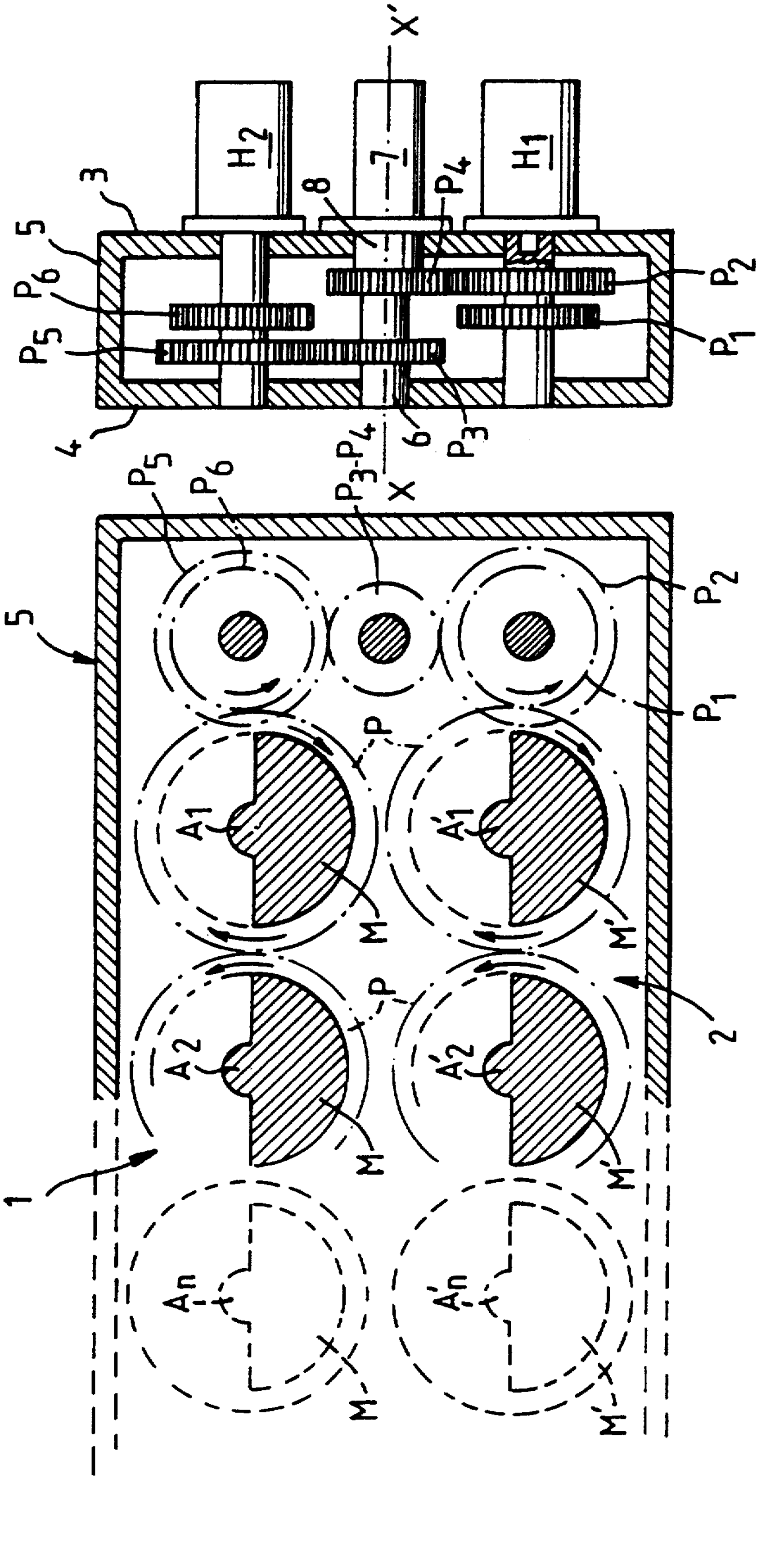
FIGS. 1 and 2 are two schematic sectional views, respectively axial and transversal, of a variable-moment vibrator embodying the invention.

In the example represented in FIGS. 1 and 2, the vibrator comprises two off-center feeder trains 1, 2, mounted rotatably by means of shafts $A_1$, $A_2$, $A_n$–$A'_1$, $A'_2$, $A'_n$ parallel to a transversal axis X, X', and whose ends fit into bearings borne by two parallel flanges 3, 4 constituting the two lateral sides of a housing 5.

With each of the feeders M, M' is associated a pinion P arranged and dimensioned so that the pinions P associated with a same train 1, 2 of feeders M engage with one another, in successive pairs.

In this example, each train of feeders M comprises a pair of feeder M/pinion P sets represented in full lines, the set partially represented in broken lines indicating the layout of another pair.

The two feeder trains are rotatably driven by means of a motorization comprising two hydraulic engines $H_1$, $H_2$ mounted on the flange 3 at one of the ends of the housing 5.

These two engines $H_1$, $H_2$ drive two respective parallel shafts running through bearings that are interdependent with the flanges 3, 4 and each bear two coaxial pinions $P_1$, $P_2$–$P_5$, $P_6$.

Pinions $P_1$ and $P_6$ respectively engage with the pinions P associated with the feeders M' and M to rotatably drive trains 2 and 1.

Pinion $P_5$ is disposed so as to engage with a pinion $P_3$ interdependent with an output shaft 6 of a hydraulically controlled phase shifter 7. This phase shifter 7 further comprises an input shaft 8 which is coaxial with the output shaft 6 and bears a pinion $P_4$ engaged with pinion $P_2$ driven by the engine $H_1$.

Figure 3:
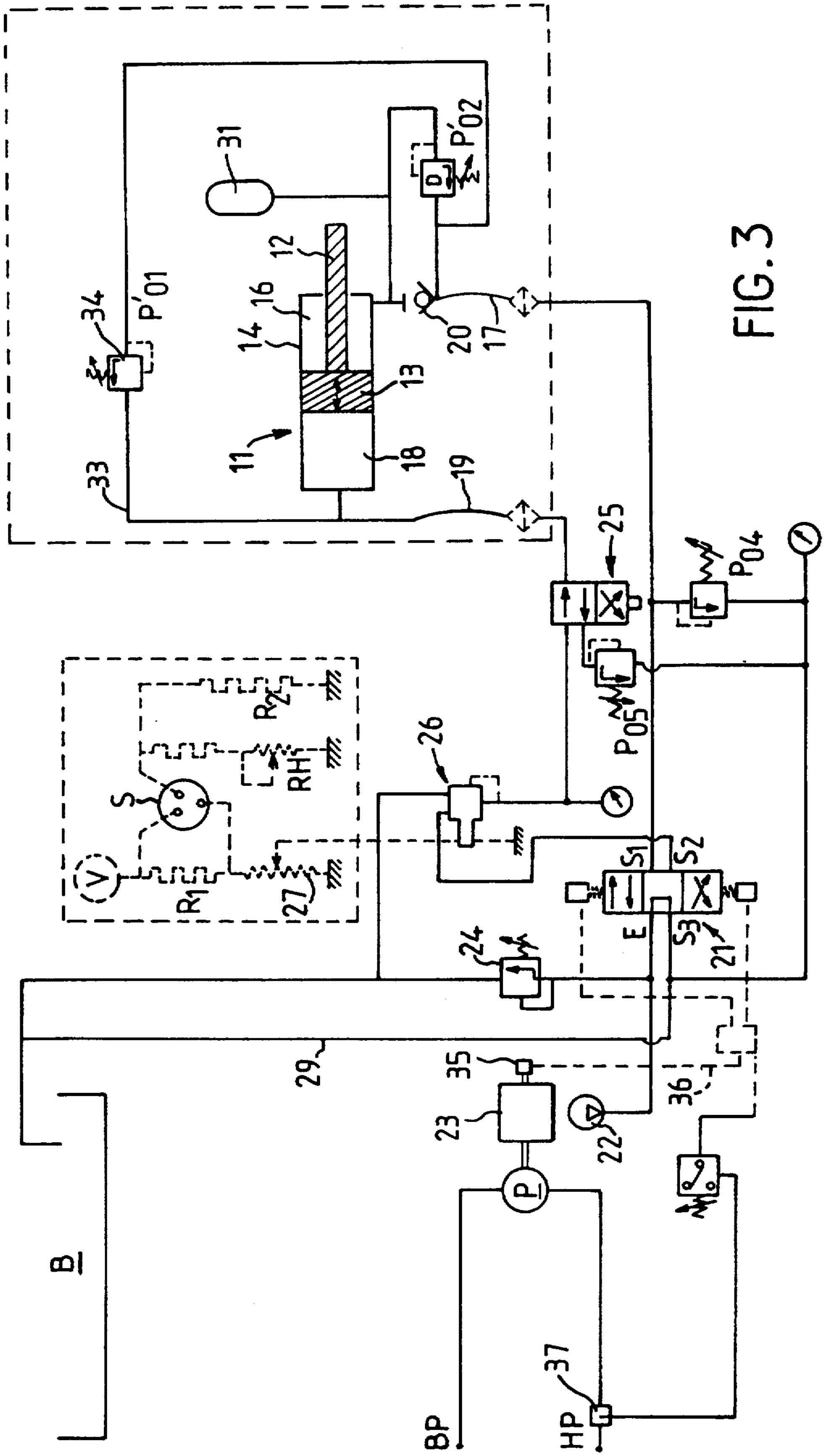
FIG. 3 is a hydraulic diagram of the energy feed and vibrator controlling circuit represented in FIGS. 1 and 2.

In the example illustrated in FIG. 3, the phase shifter controlling device has been schematically represented in the form of a dual-effect hydraulic jack 11 whose rod 12, which is interdependent with the piston 13, activates a phase shifting mechanism that can comprise a Pecqueur planetary train or even a rotating link comprising two rotating elements axially mobile in relation to one another. In the latter case, at least one of these elements comprises a helicoidal groove which cooperates with part of the other element so that an axial displacement of one of the two elements with regard to the other, e.g. under the effect of the rod 12, generates a relative rotation of these two elements.

The piston 13 delimits two chambers inside the cylinder 14 of the jack 11, i.e.

- a phase shifting chamber 16 run through by the rod 12 and connected to a phase shifting circuit 17,
- a rephasing chamber 18 connected to a rephasing circuit 19.

The transmission between the rod 12 of the piston 13 and the phase shifting mechanism control is designed in such a way that:

- a displacement of the piston 13 tending to reduce the volume of the phase shifting chamber 16, under the effect of a pressurized hydraulic fluid injected into the rephasing chamber 18, causes a rephasing of the phase shifter until, at the end of the stroke of piston 13, the feeder trains are in phase and, consequently, the amplitude of the vibrations is at maximum level, and
- a displacement of the piston 13 tending to reduce the volume of the rephasing chamber 18, under the effect of a pressurized hydraulic fluid injected into the phase shifting chamber 16, causes a phase shift of up to 180° (opposition of phase) and, consequently, a decrease or even a complete cancellation of the vibrations.

The phase shifting circuit 17, which comprises a non-return valve 20, is connected to one $S_1$ of the three outputs $S_1$, $S_2$, $S_3$ of a distributor 21 whose input E is connected to the output of a hydraulic pump 22 driven by a diesel engine 23, and of which an output $S_3$ is connected to the tank B by a tank-return circuit 29.

In this example, the pressure of the hydraulic fluid applied at input E of the distributor 21 is limited to a safety value by means of a tank-return circuit comprising a pressure-sensitive switch 24 calibrated e.g. for a pressure below the maximum admissible pressure for the rest of the phase shifting and/or rephasing circuit.

Likewise, the output $S_1$ of the distributor 21 is connected to the return circuit 29 by means of a pressure-sensitive switch $P_{04}$ calibrated e.g. for a value selected as a function of the required low pressure in the accumulator and phase shifting chamber.

The engine 23 also drives a second, more powerful, hydraulic pump P intended to supply the hydraulic engines of the vibrator.

The rephasing circuit 19, which is connected to a second output $S_2$ of the distributor 21, comprises, in series, a distributor 25 and a pressure regulator 26 enabling the pressure of the fluid injected into the rephasing chamber 18 to be varied within a pressure range [$P_1$, $P_2$] by means of a potentiometric control 27.

Depending on the control (manual or automatic) applied to it, the distributor 21 orientates the flow of hydraulic fluid generated by the pump 22:

- to the tank B via the tank-return circuit 29 (idle position indicated in FIG. 4),
- towards the phase shifting circuit 17 by making the rephasing circuit 19 communicate with the tank B via circuit 29 (position 1), or towards the rephasing circuit 19 by making the phase shifting circuit 17 communicate with the tank-return circuit 29.

The phase shifting chamber 16 of the jack 11 is furthermore connected to a hydraulic accumulator 31 whose hydraulic pressure increases as the volume of oil in the phase shifting chamber 16 is transferred from the jack 11 to the accumulator 31.

By means of a judicious choice of the features (gas volume and pressure, initial load pressure of hydraulic oil), this accumulator 31 is used in conjunction with the pressure regulator 26 to ensure that to each hydraulic fluid pressure value supplied by the regulator 26, corresponds a position of the piston 13 in the cylinder 11, and a corresponding phase shifting of the phase shifter.

Furthermore, depending on the control applied to it, the distributor 25 ensures a link between the pressure regulator 26 and the rephasing chamber 18 or between the latter and the tank B return circuit 29, by means of a pressure-sensitive switch $P_{05}$ calibrated e.g. to provide an appropriate braking of the oil evacuated from the rephasing chamber.

To avoid all risks of the phase shifter blocking prematurely due to excessive pressure in the accumulator 31, the pressure admitted in the latter is peak limited to a value $P'_{02}$ by means of a pressure limiter D calibrated for a judiciously chosen value below $P_2$ (maximum value of the pressure discharged by the regulator). This limiter D short-circuits the valve 20 in order to enable a rephasing of the phase shifter in all circumstances, and consequently a complete deployment of the moment of the vibrator.

Reciprocally, the rephasing chamber 18 is periodically brought under pressure, e.g. every time the vibrator is shut down, by means of a line 33 in which the pressure is limited to a value $P'_{01}$ by means of a pressure limiter 34 connected to the output of the regulator 26 and selected at a sufficiently high level to:

i) stabilize the phase shift pressure and enable the completely phase shifted position to be obtained when the rephasing chamber 18 of the jack 11 is communicating with the tank-return (rephasing control at minimum), and ii) enable the accumulator 31 to develop sufficient pressure as it fills up to sufficiently balance the pressure controlled by the pressure regulator 26.

The choice of pressure couples $P'_{01}$ and $P'_{02}$ within the range of variations $P'_1$–$P'_2$ of the accumulator 31, in the absence of a pressure limiter, ensures a renewal of the hydraulic oil in the accumulator 31/rephasing chamber 18 circuit, thereby eliminating venting problems during successive loads in the phase shifted and complete rephasing positions.

As previously mentioned, the device previously described enables a particularly advantageous solution to be provided for hitherto critical operating phases such as the starting up of the diesel engine 23, the starting up of vibrations, the stoppage of vibrations and pile driving in hard ground.

In this way, the diesel engine 23 can be started up with no load, with the feeder trains in opposition of phase (moment nil).

In addition, to avoid having the pump 22 under pressure when the diesel engine 23 is started up, the automatic positioning of the distributor in position 1, and consequently the phase shifting of the phase shifter, are subordinated to the starting up of the diesel engine 23. For this purpose, e.g. an automatic control of the accelerator position is used, or an engine 23 rotational speed sensor 35 which acts on the distributor 21 (link 36 in broken lines) when the rotational speed of the engine 23 exceeds a predetermined threshold. This disposition also enables the feeder trains of the vibrator to be placed in opposition of phase and therefore said vibrator to be started up without triggering vibrations.

To avoid all premature propagation of low-frequency vibrations, the tripping of the distributor 21 to position 2 is electrically subordinated to the obtaining of a minimum hydraulic flow rate (usually a flow rate corresponding to the minimum vibration frequency) in the main hydraulic circuit supplying the hydraulic engines of the vibrator. For this purpose, it is possible to use a flow rate sensor 37 placed in the main hydraulic circuit or an automatic control operating a condition associated with the generation of a sufficient flow rate by the main pump. This sensor or this automatic control acts on the distributor 21 in such a way that the switching to position 2 is prohibited as long as the flow rate detected is below a predetermined threshold. If required, this sensor 37 can automatically trip the distributor to position 2 once the above-mentioned threshold has been exceeded or, conversely, automatically trip the distributor to position 1 when the flow rate falls below the above-mentioned threshold and, more generally, once the frequency conditions are no longer fulfilled, notably once the main flow is manually reduced. This process, which takes place during the shutdown phase, enables the low-frequency vibrations which usually occur during this phase to be avoided.

In fact, two methods can be used to suppress these nuisances caused by decreases of the frequency of the vibrator associated with an increase of the power and pressure required for pile driving. These methods consist in:

i) acting directly on the supply to the rephasing circuit by tripping the distributor 21 to the idle position;

ii) triggering the distributor 25 so as to make the rephasing chamber 18 communicate with the pressure limiter $P_{05}$ which is calibrated for a pressure value corresponding to the required amplitude reduction.

An important particularity of the device previously described consists in that it enables additional power to be provided to the vibrator by exploiting a pumping phenomenon usually deemed detrimental.

In fact, it so happens that these hydraulic transmissions, such as those used between the main pump P and the hydraulic engines of the phase shifter, necessarily have a high-pressure valve which is quickly relayed by an automatic control reducing the hydraulic flow rate (reduction of the slant of the hydraulic pump plate or suppression of a barrel in the case of multiple-barrel pumps or diversion of part of the flow). This has the undesirable effect of reducing the rotational speed of the hydraulic engines and therefore the operating frequency of the machine, thereby increasing the vibratory nuisance it causes. By automatically controlling the tripping of distributor 21, from position 2 (rephasing) to position 1 (phase shifting), by the measurement of a pressure just below the pressure triggering the decrease of the discharge rate, all loss of frequency of the vibrator is avoided while enhancing pile driving. In fact, the perception of this critical pressure by the automatic control leads to a reduction of the moment of the vibrator, and therefore its vibratory amplitude and the power consumed by the vibrator. For a constant flow rate, this is translated by a decrease in the hydraulic pressure in the transmission.

This produces an improvement in the hydraulic output of the transmission tending to slightly increase the rotational speed of the feeders, and consequently their kinetic rotational energy. When the pressure is perceived to fall below the critical pressure, this causes a reverse tripping of the distributor 21, and therefore a redeployment of the moment.

During this transitional phase, the vibrator disposes of both the power provided by the hydraulic transmission and the momentum accumulated in the feeders, until the critical pressure is reached again.

The pulsatory operating conditions thus established for the vibrator are particularly efficient for difficult ground, while avoiding falling below the frequencies that generate undesirable shocks.

Figure 4:
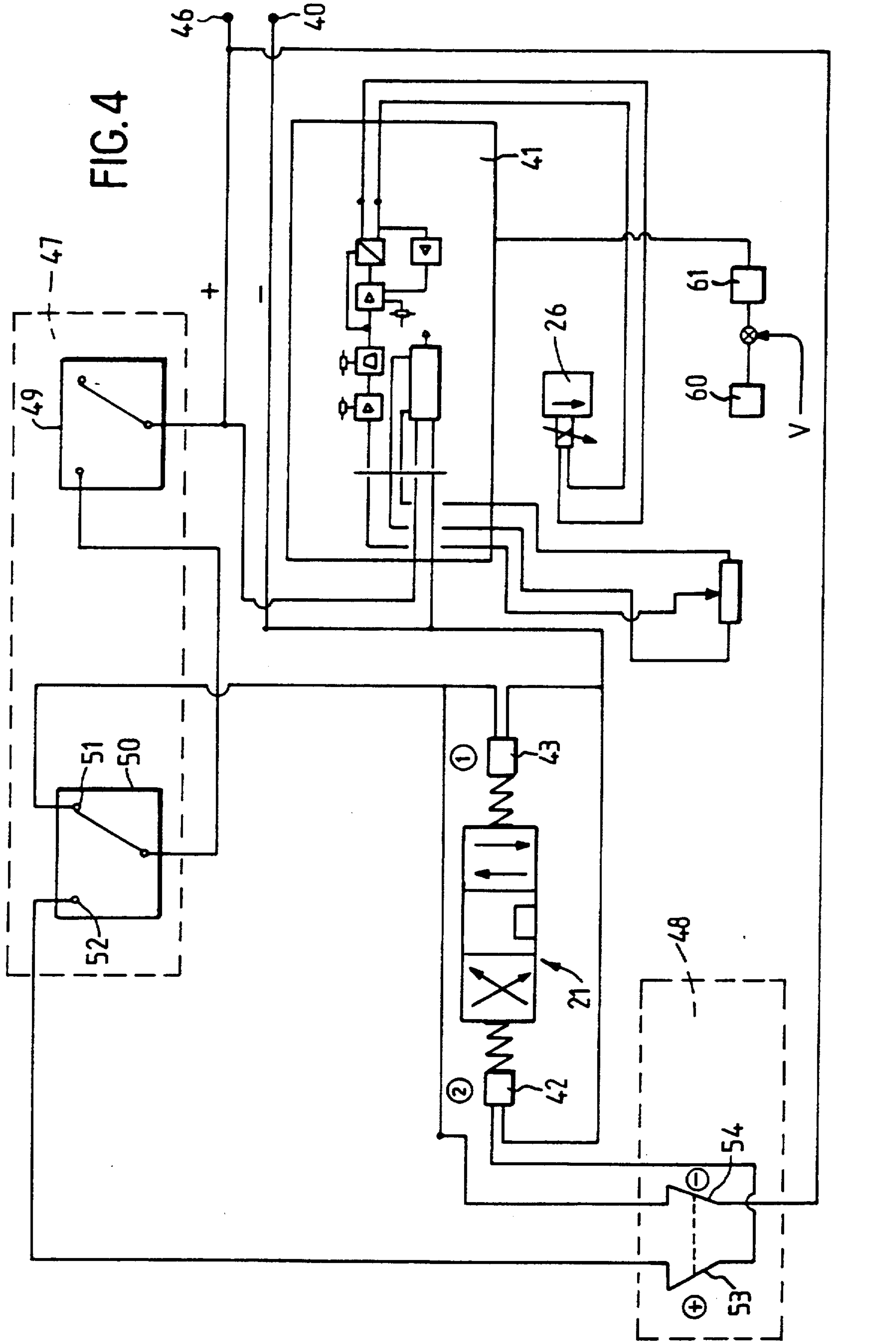
FIG. 4 is a diagram of the electrical circuit associated with the hydraulic circuit represented in FIG. 3.

FIG. 4 shows a skeleton diagram of an electrical control circuit associated with the hydraulic circuit previously described.

This control circuit is powered by a d.c. power supply whose negative terminal 40 is connected to the ground of:

- the electrical circuit 41 of the pressure regulator 26 enabling a potentiometric adjustment of the pressure applied to the rephasing chamber 18, and
- the solenoids 42, 43 controlling the distributor 21.

The positive terminal 46 of the power supply is connected to:

- the input of a switching device 47 associated with the contact enabling the diesel engine 23 to be started,
- the electrical circuit 41 of the pressure regulator 26,
- a switch 48 activated as a function of the discharge rate of the main pump P.

The switching device 47 comprises a first circuit breaker 49 in series with a switch 50 of which a first output 51 is connected to the solenoid 43 controlling position 1 of the distributor 21, and of which a second output 52 is connected to the switch 48.

This switch 48, which is activated as a function of the discharge rate of the main pump P, comprises two circuit breakers 53, 54 operated alternately, i.e.

- a circuit breaker 53 ensuring an interruptible link between the contact of relay 52 and the solenoid 42 enabling the distributor 21 to be tripped to position 2,
- a circuit breaker 54 enabling the solenoid 43 of distributor 21 to be connected to the positive terminal 46 of the power supply.

The circuit previously described operates as follows:

When the diesel engine 23 is stopped or running at a speed not exceeding the idling speed, the circuit breaker 47 and the switch 51 are in the position indicated in FIG. 4:

- circuit breaker 47 being open,
- switch 50 routing the output of circuit breaker 47 towards solenoid 43.

Consequently, the distributor 21 is in the idle position. This is also the case when the engine is running at idling speed after it has been started up.

Upon starting up engine 23, detection of a speed exceeding the idling speed firstly causes circuit breaker 49 to close so that the distributor 21 trips to position 1 to authorize the feeder trains of the vibrator to move into opposition of phase.

Detection of a sufficient discharge rate of the main pump P, subsequent to a discharge rate command causing circuit breaker 53 to close, then causes a tripping of switch 50 to its output 51 and, consequently, the energizing of the solenoid 42 of distributor 21 which trips to position 2 (rephasing with deployment of the moment of the vibrator).

The subsequent detection of a discharge rate of the main pump P below a threshold value will then cause a tripping of switch 48 (circuit breaker 53 open/circuit breaker 54 closed) and, consequently, the switching of distributor 21 from position 2 to position 1 (phase shifting with reduction of the moment).

A pumping process is thus obtained of the type previously described and whose amplitude can be adjusted by electronic or mechanical means acting on the difference between the threshold values of the pressure of the hydraulic fluid discharged by the hydraulic pump.

Another important advantage of the device previously described consists in it enabling the amplitude command to be automatically controlled either for a noise level, or for a level of vibratory amplitude measured in the ground notably with a view to complying with noise or vibration standards at the boundary of the site.

For this purpose, in the sensitive zone to be protected, there is a device 60 measuring the noise or vibrations. The result of this measurement is compared with reference value V in a comparator. The latter acts on the pressure regulator so as to establish an appropriate phase shifting tending to cancel the difference between the measured value and the reference value.

A connecting network 61, e.g. of the PID type, can be used this time to avoid the oscillations and to maintain the performances of the device at their maximum compatible with the reference values.

It ensues from the preceding description that the amplitude control principle of the vibratory moment is based on the association of a control pressure with a phase shift position, by means of the stable balance obtained between the engine torque due to the control pressure on the one hand, and on the other hand the natural load moment of the system, modified and completed by a known load moment.

Various methods can be envisaged to obtain this balance:

- It is firstly possible to use just the Spontaneous rephasing torque generated by the vibrator, the torque to be applied being a certain function of the rephasing angle.
- To this torque can also be added the torque generated in the phase shifter by a constant back pressure, e.g. by means of a high-volume accumulator so as to limit the back pressure to the minimum required to obtain the reverse phase shift to the one imposed by the control.
- Utilisation of a gas pressure accumulator, with a volume e.g. equal to twice or three times the volumetric displacement of the phase shifting jack, and whose pressure varies substantially with the phase shift angle, provides greater sensitivity to the pressure. By judiciously choosing the features of the accumulator, this solution further enables the P=f (phase shift) function to be made monotonic when it is not at the origin and, consequently, to simplify the control mode by obtaining a single phase shift value (to within a hysteresis) for a given pressure value, and especially to ensure the stability of the phase shifting as a function of the control.

The utilisation of a mechanical accumulator whose back pressure is produced by means of a jack fitted with a spring enables the additional back pressure curve to be linearized as a function of the phase shift angle.

It is also possible to apply an intermittent back pressure only when requiring a reverse motion to the one imposed by the control or to a limiter or pressure reducer that can be controlled by a potentiometer which can be controlled either manually or by an automatic control.

In all cases, it will be possible to use a means enabling the pressure to be varied in the phase shifting chamber and/or rephasing chamber by means of a hydraulic circuit running into different pressure limiters, via selector-controlled distributors.

Figure 5:
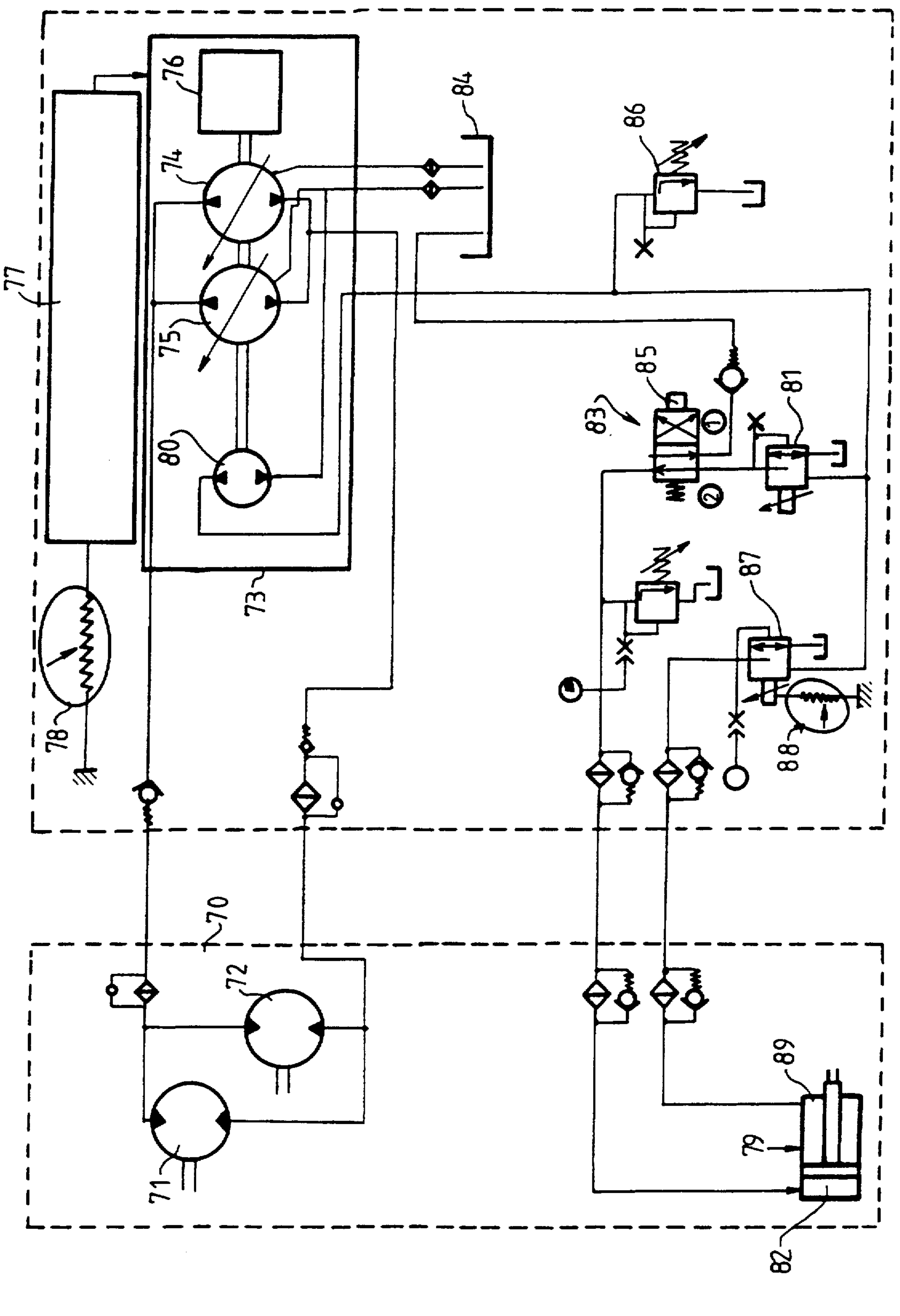
FIG. 5 is a hydraulic diagram of another embodiment of the feed circuit for a variable-moment vibrator embodying the invention.

In the example represented in FIG. 5, the variable-moment vibrator, which has been schematically represented by a block in broken lines 70, comprises two hydraulic engines 71, 72 supplied by a generator of pressurized hydraulic fluid 73 comprising two pump barrels 74, 75 driven by an engine 76, e.g. a diesel engine. The discharge rate of this generator is monitored by a servocontrol device 77 controlled by a potentiometer 78.

The phase shifter 79 is controlled by a hydraulic circuit supplied by an auxiliary pump 80 driven by the engine 76.

This auxiliary pump 80 discharges towards a mechanical pressure limiter 81 which maintains a pressure Pr equal to a value corresponding to the rephasing pressure. The output of this limiter 81 is connected to the rephasing chamber 82 of the phase shifter via an electromechanical distributor 83 which is in the on-state in the idle position and which deviates the flow of oil towards the tank 84 when its coil 85 is energized.

The hydraulic fluid delivered by the auxiliary pump 80, which is furthermore monitored by a pressure limiter 86 limiting the maximum control pressure to a value Pmax, is applied to a second electrically controlled pressure reducer 87 which discharges fluid at a pressure that can be adjusted between a maximum phase shifting pressure Pdmax and a minimum phase shifting pressure Pdmin by means of an electronic control circuit which is master controlled by a potentiometer 88.

The output of this reducer 87 is connected to the phase shifting chamber 89 of the phase shifter 79.

Figure 6:
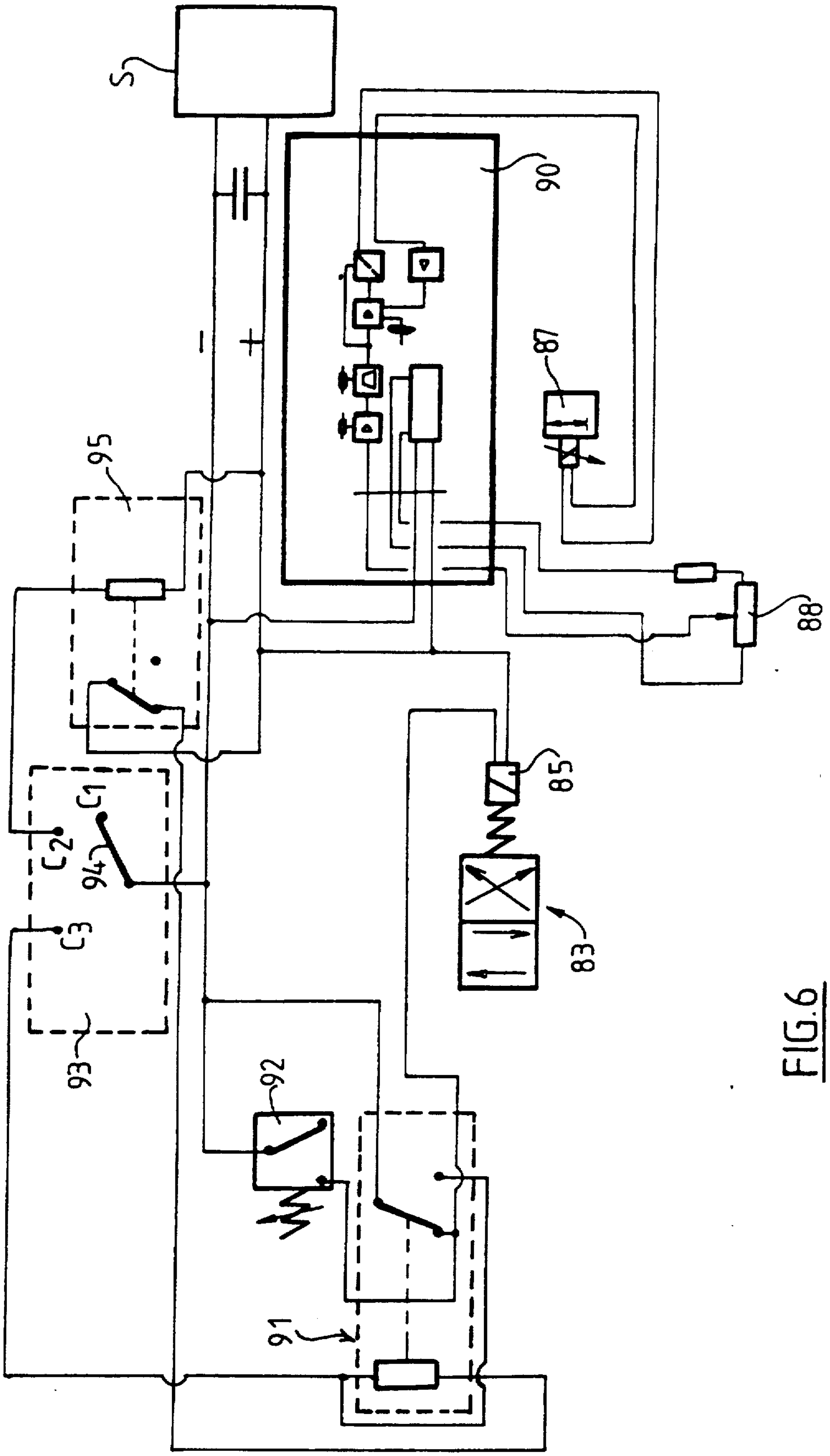
FIG. 6 is a diagram of the electrical circuit associated with the hydraulic circuit represented in FIG. 5.

With the hydraulic circuit previously described is associated an electric control circuit (FIG. 6) powered by a d.c. source which supplies, on the one hand, the electronic circuit 90 of the pressure regulator enabling potentiometric adjustment (potentiometer 88) of the pressure applied to the phase shifting chamber 89, and, on the other hand, the solenoid 85 of distributor 83 via a switching circuit comprising a relay 91 on which is mounted in parallel a pressure-sensitive switch 92 which closes when the pressure of the fluid discharged by the two pump barrels is greater than or equal to a pressure PM.

This control circuit also uses a rotary selector 93 coupled mechanically to the potentiometer 78 and whose rotary cursor 94 temporarily sweeps and switches a plurality of contacts (in this instance contacts $C_1$, $C_2$, $C_3$) as it rotates.

In this example, the cursor 94 is connected to the negative pole of the power supply.

Contact $C_1$ is pointed upwards (not connected to any circuit).

Contact $C_2$ is connected to the positive pole of the power supply via the coil KA2 of a relay 95 which controls the application of the positive pole to one of the ends of the coil KA3 of relay 91.

Contact $C_3$ is connected to the other end of the coil KA3 of relay 91.

From the hydraulic point of view, the device previously described operates as follows:

Irrespective of the position of the potentiometer 88 adjusting the pressure reducer 87 (between the minimum and maximum phase shifting pressures), when the coil 85 of distributor 83 is energized and when the latter switches from its idle position represented in FIG. 5 (in which it was before the machine was started up) to its second position, the rephasing circuit is connected to the tank 84, and only the phase shifting chamber 89 is supplied (with at least the minimum phase shifting pressure Pdmin) and, consequently, the vibrator 70 does not generate any vibratory amplitude.

Conversely, when the coil 85 is de-energized and, consequently, the distributor switches to the idle position (when the unbalanced masses reach a sufficient speed), then the rephasing chamber 82 is supplied with fluid at the rephasing pressure (which is slightly lower than the maximum phase shifting pressure) imposed by the reducer 87.

The phase shifting chamber 82 is supplied with fluid at a pressure included between the maximum and minimum phase shifting pressures.

When the phase shifting pressure is at its maximum (by convention, the zero position on potentiometer 88), then the phase shifter 79 is subjected to a resultant phase shifting pressure (difference between the maximum phase shifting pressure and the rephasing pressure). Since the phase shifter 79 was initially in the totally phase shifted state and the rephasing requires a sufficient resultant phase shifting pressure to overcome the friction and resistance to the creation of vibrations, no vibrations can be generated.

When the potentiometer 88 is then turned towards increasing amplitudes and, as a result, a reduction of the phase shifting pressure is commanded from the maximum towards the minimum, then the rephasing chamber 82 is maintained at the rephasing pressure while the pressure in the phase shifting chamber 89 falls below this rephasing pressure. The resultant pressure is therefore a rephasing pressure and, consequently, the phase shifter starts to rephase the feeders of vibrator 70 until the amplitude of vibration generated by the feeders dynamically generates a relative torque opposing the torque exerted by the phase shifter 79 under the effect of the resultant pressure.

The volumetric displacements of phase shifter 79 and the values applied are selected so as to obtain the maximum useful amplitude for a complete rephasing of the two feeder trains when the phase shifting back pressure reaches its minimum value.

The choice of the minimum phase shifting pressure is the one which enables a complete phase shifting of the feeders to be achieved in the absence of rephasing pressure.

A pressure limiter calibrated for the maximum phase shifting pressure value is mounted in the rephasing circuit to clip the pressure peaks observed when, under the effect of the maximum phase shifting pressure, the fluid contained in the rephasing chamber 82 is forced back towards the tank 84.

The electronic control circuit then operates as follows:

Contact $C_1$ of the rotary selector 93, which corresponds to the zero of potentiometer 78 and therefore to a zero discharge rate, is used for start-up safety (the generator of pressurized hydraulic fluid 73 cannot be started up if the pumps 74, 75 do not have a zero discharge rate, to avoid starting up the engine 76 under pressure and rotating the feeders upon start-up).

In fact, when the selector 93 is positioned on contact $C_1$, relays 95 and 91 are in the break position and the pressure-sensitive switch 92 is open. The coil 85 of distributor 83 is powered and the latter is therefore in the idle position and returns the fluid discharged by the auxiliary pump 80 to the tank 84.

Contact $C_2$ corresponds to a position of the potentiometer 78 controlling a speed close to the minimum vibration speed, e.g. 1,650 rpm below which one wishes to forbid all vibrations of insufficient and therefore harmful frequency.

When the selector 93 is positioned on this contact $C_2$, relay 95 switches to the energized state while relay 91 remains in the break position. The coil 85 of distributor 83 therefore remains in the energized state.

Contact $C_3$ corresponds to a position of the potentiometer 78 controlling the minimum vibration speed, e.g. 1,800 rpm.

In this position, relay 95 is in the break position while relay 91 switches to the energized state (with self-locking), interrupting the power supply to the coil 85 of distributor 83 which commutates while ensuring the connection of the output of limiter 81 to the rephasing chamber 82. The pressure-sensitive switch 92 enables the distributor coil circuit to be closed, and therefore to be energized, when the pressure of the hydraulic fluid in the two pump barrels 74, 75 reaches the maximum admissible hydraulic pressure (this pressure is associated with the maximum available power inherent in the thermal engine).

By means of these arrangements, when the discharge from pump barrels 74, 75 starts up, thereby causing the feeders to rotate, for all speed values below the minimum vibration value, the coil 85 of distributor 83 is energized, thereby prohibiting the generating of the rephasing pressure and therefore of all vibrations.

When the minimum vibration speed is reached and exceeded, the coil 85 is in the de-energized state and the vibratory amplitude is established at a level controlled by the potentiometer 88, determining the position of the pressure reducer 87.

It is then possible to set the rotational speed of the feeders (i.e. the frequency) to any value between the maximum frequency and the minimum frequency and, for each minimum vibration frequency value, to adjust the vibratory amplitude between zero and the maximum amplitude associated with the maximum eccentricity moment (feeders rotating in phase).

Once the speed is reduced below the value deemed critical (for the propagation of shakes in the ground and shocks towards the holder), e.g. 1,650 rpm (contact $C_2$), the coil 85 of distributor 83 will be energized by means of the returning of the solenoid 91 to the idle position. As a result, the distributor 83 will trigger the reduction and suppression of the vibratory amplitude, irrespective of the position of potentiometer 88 controlling the amplitude, thereby enabling the machine to be stopped without vibrating.

When the vibrator 70 generates vibrations, i.e. when the coil 85 of distributor 83 is isolated from the negative pole of the power supply S, due to the self-locking of relay 91 in the energized position, and if the pressure rises to the maximum admissible pressure, due to the pressure-sensitive switch 92 being closed, the coil 85 of distributor 83 will again be energized.

In this case, the restoring torque towards the phase shifting of the feeders is all the greater that the ground resists and causes a build-up of the pressure generated by the two pump barrels 74, 75. This torque is added to the sole phase shifting pressure controlled by potentiometer 88. It acts on the phase shifter 79 to rapidly phase shift the feeders and thereby decrease the amplitude of the vibrator 70 and, consequently, the power required to maintain the vibration, and therefore the pressure called for by the hydraulic engines 71, 72 of the vibrator 70.

From then on, the hydraulic output of the generator 73 improves and the speed of the engine 76 increases by an additional few hundred rpm. The rotating assembly therefore accumulates momentum while the pressure-sensitive switch 92 commutates, causing distributor 83 to commutate. The latter restores the supply of rephasing pressure which will quickly put the feeders back in phase. During this transitional phase, the vibrator 70 delivers into the ground the maximum power supplied by the generator 73 and the power associated with the surplus kinetic rotating energy of the feeders whose rotational speed decreases by a few tens of rpm within a few tenths of a second until the pressure again exceeds the maximum admissible pressure. This pulsation phenomenon enables the vibrator 70 working in hard ground to avoid significant drops in frequency (drops limited to 10%), unlike traditional vibrators which lose up to 50% of their frequency. The performance of the machine is thus enhanced.

I claim:

1. A device for the controlling of a variable-moment vibrator of the type comprising at least two off-center rotating feeders rotatably driven at a same speed and a phase shifter capable of generating an angular displacement between these feeders while they are rotating so as to generate a vibrator moment having a variable amplitude, the phase shifter being controlled by means of a dual-effect hydraulic acting element having a determined volumetric displacement and comprising a rephasing chamber and a phase shifting chamber separated by a piston, this acting element being supplied with pressurized fluid discharged by a pump via a hydraulic circuit comprising a distributor having at least:
   - an idle position in which it interrupts the supply of pressurized fluid to one or other or to both the chambers of said acting element, and
   - a working position in which the distributor orientates said pressurized fluid to one of the above-mentioned chambers, via a first distributing circuit, wherein said first distributing circuit comprises a first limiting means enabling, by way of a control mechanism, the pressure it applies to one of said two chambers to be varied within a predetermined range, and wherein the other chamber is connected to a second distributing circuit comprising a means enabling the pressure it applies to said second chamber to be modulated according to an appropriate counterprofile, so that said acting element applies a motive force to said phase shifter in keeping with a tractive resistance resulting from the amplitude of the vibrator movement and that a predetermined amplitude of the vibrations thus corresponds to each value displayed on the said control mechanism.

2. The device as claimed in claim 1, wherein said means enabling the pressure to be modulated is mounted in a phase shifting circuit connecting said distributor to said phase shifting chamber and comprises a nonreturn valve and a hydraulic accumulator whose load pressure can be limited by means of a limiter.

3. The device as claimed in claim 2, wherein the means enabling the pressure to be varied in said phase shifting chamber and in said rephasing chamber comprises a pressure regulator having a determined range.

4. The device as claimed in claim 3, wherein said nonreturn valve is short-circuited by a first pressure limiter calibrated for a value below a maximum pressure value of said range of said regulator.

5. The device as claimed in claim 4, which comprises a second pressure limiter on the phase shifting circuit, for stabilizing the phase shifting pressure.

6. The device as claimed in claim 1, which comprises a limiter adjustable to a pressure enabling the phase shifting for a minimum rephasing command.

7. The device as claimed in claim 2, which comprises a pressure limiter enabling the said accumulator to be loaded to a sufficient level for determining a back pressure having a profile, which varies as a function of the said angular displacement.

8. The device as claimed in claim 5, wherein the said first and second distributors have calibration pressures such that the pressurized fluid in said accumulator and in said rephasing chamber is renewed.

9. The device as claimed in claim 1, wherein said feeders are driven by at least one hydraulic acting element, supplied by a pump driven by an engine whose rotational speed is detected by a sensor, said device further comprising a means enabling said distributor to be put into said idle position when said engine is started up as long as the rotational speed is below a predetermined speed or acceleration threshold.

10. The device as claimed in claim 1, wherein said feeders are driven by at least one hydraulic acting element supplied by a main pump driven by a combustion engine, said device further comprising a means enabling said distributor to be put into said idle position when said engine is started up as long as said engine is at an idling speed.

11. The device as claimed in claim 10, wherein immediately upon start-up of the engine, previously at idling speed, the distributor is put into said idle position so as to authorize said feeders of said vibrator to move into a phase shifted position, once said feeders start to rotate.

12. The device as claimed in claim 1, wherein said feeders are driven by a hydraulic motor supplied from a hydraulic pump and wherein, when said feeders build up rotational speed, said distributor trips to said working position when the discharge rate of said main pump reaches or exceeds a predetermined minimum value.

13. The device as claimed in claim 1, wherein before the rotational speed of said feeders falls below a threshold value, the distributor is returned to said idle position.

14. The device as claimed in claim 13, wherein the return to said idle position is performed automatically once the pump has discharge rate conditions and therefore frequency conditions which are no longer fulfilled.

15. The device as claimed in claim 1, wherein said feeders are driven by a hydraulic motor supplied by hydraulic fluid coming from a hydraulic main pump and said device comprises a means enabling a reduction pressure in said rephasing chamber when said hydraulic fluid discharged by said main pump has a pressure which rises above a first value, then causing the rephasing pressure to be returned to the previous value when said pressure of the discharged fluid falls below a second value.

16. The device as claimed in claim 15, wherein said values are substantially equal.

17. The device as claimed in claim 15, wherein the difference between said values can be adjusted by an electronic or mechanical means, so as to enable the amplitude of the discharge of hydraulic fluid to be adjusted.

18. The device as claimed in claim 3, wherein said pressure regulator supplies a pressure which is automatically controlled for a noise level and/or amplitude level or vibratory speed measured in the ground or on a structure.

19. The device as claimed in claim 1, wherein nuisances caused by decreases of frequency of said vibrator associated with an increase of power and pressure required for pile driving are suppressed by:

acting on the supply to said rephasing circuit by tripping said distributor to said idle position;

providing a second distributor which, when triggered, makes said rephasing chamber communicate with a pressure limiter preset to a pressure corresponding to a required amplitude decrease to a required response speed, and therefore to a required period of pulsation.

20. The device as claimed in claim 2, wherein said accumulator has a large volume so as to have a back pressure limited to a minimum needed to obtain a phase shifting reversed with respect to the one imposed by a control action when the latter is returned to a level corresponding to a minimum phase shifting.

21. The device as claimed in claim 2, wherein said accumulator has a volume of the order of twice or three times said volumetric displacement.

22. The device as claimed in claim 2, wherein said accumulator is designed so as to provide a pressure profile which varies as a function of the rephasing.

23. The device as claimed in claim 1, which comprises a mechanical accumulator enabling an additional back pressure curve to be linearized as a function of said angular displacement of the phase shifter.

24. The device as claimed in claim 1, which comprises a pressure limiter suplying said rephasing chamber with a substantially constant pressure and a pressure limiter suplying said phase shifting chamber with a pressure that can be varied between a minimum pressure and a maximum pressure substantially equivalent to the pressure of said rephasing chamber.

25. The device as claimed in claim 24, wherein the said generator of pressurized hydraulic fluid has a flow rate which is monitored by a servocontrol device controlled by a potentiometer, and wherein said distributor is controlled by means of an electrical control circuit comprising a selector coupled mechanically to said potentiometer.

26. The device as claimed in claim 25, wherein said distributor is controlled by a solenoid and said control circuit comprises a source of electrical current powering said solenoid, via a switching circuit comprising a relay on which is mounted in parallel a pressure-sensitive switch which closes when the pump discharges a fluid having a pressure which is greater than or equal to a maximum pressure, said relay having a coil which is connected to one pole of said electrical current source via the selector and to another pole of said source via a relay commanded by said selector.

27. The device as claimed in claim 1, wherein the means enabling the pressure to be varied in said phase shifting chamber and in said rephasing chamber comprises a hydraulic circuit running into different pressure limiters via selector controlled distributor.

* * * * *